United States Patent
Seydenschwanz (10) Patent No.: US 11,128,166 B2
(45) Date of Patent: Sep. 21, 2021

(54) PREDICTIVE OPERATIONAL PLANNING IN A MICROGRID TAKING INTO ACCOUNT HIGH-LOAD TIME WINDOWS OF A MAIN ELECTRICITY GRID

(71) Applicant: Siemens Aktiengesellschaft, Munich (DE)

(72) Inventor: Martin Seydenschwanz, Munich (DE)

(73) Assignee: SIEMENS AKTIENGESELLSCHAFT

( * ) Notice: Subject to any disclaimer, the term of this patent is extended or adjusted under 35 U.S.C. 154(b) by 22 days.

(21) Appl. No.: 16/679,499

(22) Filed: Nov. 11, 2019

(65) Prior Publication Data

US 2020/0177025 A1 Jun. 4, 2020

(30) Foreign Application Priority Data

Dec. 4, 2018 (EP) .................................... 18210099

(51) Int. Cl.
```
H02J 13/00        (2006.01)
H02J 3/14         (2006.01)
G05B 15/02        (2006.01)
```
(52) U.S. Cl.
CPC .......... *H02J 13/0006* (2013.01); *G05B 15/02* (2013.01); *H02J 3/14* (2013.01)

(58) Field of Classification Search
CPC .......... H02J 13/0006; H02J 3/003; H02J 3/06; H02J 3/14; G05B 15/02; Y02E 60/00; Y02B 90/20; Y02B 70/3225; Y04S 20/00; Y04S 40/20; Y04S 10/50; Y04S 20/222; G06Q 50/06; G06F 2119/06; G06F 2113/04; G06F 30/36

See application file for complete search history.

(56) References Cited

U.S. PATENT DOCUMENTS

| | | | | |
|---|---|---|---|---|
| 9,225,173 | B2 * | 12/2015 | Darden, II | G05B 15/02 |
| 9,366,704 | B2 * | 6/2016 | Haghighat-Kashani | ...................... H02J 13/00002 |
| 9,489,701 | B2 * | 11/2016 | Emadi | G06Q 50/06 |
| 9,973,002 | B2 * | 5/2018 | Lazaris | H02J 3/36 |
| 2010/0179704 | A1 * | 7/2010 | Ozog | H02J 13/0006 700/291 |
| 2010/0332373 | A1 * | 12/2010 | Crabtree | G06Q 40/04 705/37 |
| 2011/0231028 | A1 * | 9/2011 | Ozog | G06Q 50/06 700/291 |

(Continued)

OTHER PUBLICATIONS

Sandgani Mohsen Rafiee et al: "Energy Management in a Network of Grid-Connected Microgrids/Nanogrids Using Compromise Programming", IEEE Transactions on Smart Grid, vol. 9, No. 3, pp. 2180-2191, XP011661255, IEEE, USA; ISSN: 1949-3053, DOI. 10.1109/TSG.2016.2008281; [gefunden am Apr. 18, 2018]; pp. 2180-2188; 2018.

(Continued)

*Primary Examiner* — Ramesh B Patel
(74) *Attorney, Agent, or Firm* — Schmeiser, Olsen & Watts LLP (57) ABSTRACT

A target function is optimized in the predictive operational planning in a microgrid with a connection to a main electricity grid. The target function takes into account a power draw of the microgrid from the main electricity grid in at least one high-load time window of the main electricity grid.

8 Claims, 3 Drawing Sheets

(56) References Cited

U.S. PATENT DOCUMENTS

| | | | | |
|---|---|---|---|---|
| 2014/0129040 A1* | 5/2014 | Emadi | ................... | G06Q 50/06 |
| | | | | 700/291 |
| 2015/0094968 A1* | 4/2015 | Jia | ..................... | G01R 21/133 |
| | | | | 702/60 |
| 2019/0265308 A1* | 8/2019 | Fink | .................. | G01R 31/3648 |
| 2020/0174429 A1* | 6/2020 | Gottschalk | ............... | H02J 3/06 |

OTHER PUBLICATIONS

Moshi Godfrey Gladson et al: "Optimal operational planning for PV-Wind-Diesel-battery microgrid", 2015 IEEE Eindhoven Powertech, IEEE, pp. 1-6, XP033215532, DOI: 10 1109/PTC.2015.7232461; [gefunden am Aug. 31, 2015] pp. 1-4; 2015.

Gazijahani Farhad Samadi et al: "Reliability constrained two-stage optimization of multiple renewable-based micogrids incorporating critical energy peak pricing demand response program using robust optimization approach", Energy, vol. 161, pp. 999-1015, XP085472796, Elsevier, Amsterdam, NL ISSN: 0360-5442, DOI: 10.1016/J.ENERGY. 2018.07.191; pp. 1001-1007; 2018.

\* cited by examiner

PREDICTIVE OPERATIONAL PLANNING IN A MICROGRID TAKING INTO ACCOUNT HIGH-LOAD TIME WINDOWS OF A MAIN ELECTRICITY GRID

CROSS-REFERENCE TO RELATED APPLICATIONS

This application claims priority to European Application No. 18210099.0, having a filing date of Dec. 4, 2018, the entire contents of which are hereby incorporated by reference.

FIELD OF TECHNOLOGY

The following relates to predictive operational planning in a micro-electricity grid (simply microgrid below), wherein the microgrid has a connection to a main electricity grid. The following also relates to predictive operational planning such that this takes into account a power draw of the microgrid from the main electricity grid in at least one high-load time window of the main electricity grid.

BACKGROUND

Decentralized electricity generation in microgrids—for example for autonomous power supplies for industrial installations or islands—for example using a combination of conventional generators and renewable energy sources, is used on a widespread scale. In many cases, a microgrid also comprises a connection to a main electricity grid. The operation of the microgrid is thereby able to be made more flexible and additionally be better protected against failure.

Microgrids generally describe a localized group of electricity sources and electricity consumers. Microgrids may comprise conventional electricity sources and renewable electricity sources. The microgrid typically has a limited extent in comparison with main electricity grids. Typical consumers in a microgrid are for example: dwellings; car batteries; industrial installations; machines; etc. Typical electricity sources are for example: photovoltaic installations; diesel generators; wind farms; etc. A microgrid may be used for example in an apartment block, a flat-sharing community, a military base, a research station or the like. Microgrids may be used for example for autonomous power supplies for industrial installations or islands.

A microgrid may be connected to a main electricity grid by way of a connection. By virtue of providing a connection of the microgrid to the main electricity grid, particularly flexible operation of the microgrid is able to be made possible. Protection against failure is also able to be made possible by falling back on the electricity supply from the main electricity grid. Operation of the main electricity grid is able to be stabilized and supported.

The operation of the main electricity grid may be supported by the microgrid, for example by taking into account what are known as high-load time windows (HLTWs). In this case, the power draw of the microgrid from the main electricity grid may for example be reduced in the HLTWs. Such behavior is referred to as atypical grid usage.

By taking into account HLTWs of the main electricity grid during operation of the microgrid, it is possible to absorb generation or consumption peaks in the main electricity grid. Operation of the main electricity grid is thereby able to be supported. Overloading is avoided.

SUMMARY

There is a need to integrate techniques in connection with HLTWs of a main electricity grid into predictive operational planning of the microgrid with a connection to the main electricity grid. This object is achieved by the features of the independent patent claims. The features of the dependent patent claims define embodiments.

A method for predictive operational planning in a microgrid that has a connection to a main electricity grid comprises: Optimizing a target function for a planning interval. The target function in this case takes into account a power draw of the microgrid from the main electricity grid in at least one HLTW of the main electricity grid. The method furthermore comprises performing the operational planning based on the result of the optimization.

A device comprises a processor. The processor is configured so as to optimize a target function for a planning interval. The target function takes into account a power draw of a microgrid from a main electricity grid in at least one HLTW of the main electricity grid. The processor is furthermore configured so as to perform operational planning of the microgrid based on the result of the optimization.

A computer program or a computer program product or a computer-readable storage medium comprises program code (non-transitory computer readable storage medium having instructions, which when executed by a processor, perform actions). The program code may be loaded and executed by a processor. When the processor executes the program code, this has the effect that the processor executes the following steps: Optimizing a target function for a planning interval. The target function takes into account a power draw of a microgrid from a main electricity grid in at least one HLTW of the main electricity grid. And performing operational planning of the microgrid based on a result of the optimization.

The features explained above and features that are described below may be used not only in the corresponding explicitly defined combinations but also in other combinations or on their own without departing from the scope of protection of embodiments of the present invention.

BRIEF DESCRIPTION

Some of the embodiments will be described in detail, with reference to the following figures, wherein like designations denote like members, wherein.

DETAILED DESCRIPTION

The above-described properties, features and advantages of embodiments of the invention and the manner in which they are achieved become more clearly and distinctly comprehensible in conjunction with the following description of the exemplary embodiments which are explained in more detail in connection with the drawings.

The embodiments are described in more detail below on the basis of preferred embodiments with reference to the drawings. In the figures, identical reference signs denote identical or similar elements. The figures are schematic representations of various embodiments of the invention. Elements illustrated in the figures are not necessarily illustrated true to scale. The various elements illustrated in the figures are rather reproduced in such a way that their function and general purpose becomes comprehensible to a person skilled in the art. Connections and couplings illustrated in the figures between functional units and elements may also be implemented as an indirect connection or coupling. A connection or coupling may be implemented in wired or wireless form. Functional units may be implemented in the form of hardware, software or a combination of hardware and software.

Techniques in connection with predictive operational planning in a microgrid are described below. This means that one or more nodes of a microgrid are able to be controlled in line with a corresponding operational plan. For example, consumption, output power, operating frequency etc. could accordingly be controlled. As an alternative or in addition, the operational plan could also determine an architecture of the microgrid, that is to say for example an interconnection of nodes etc. The operational plan may define one or more such parameters for a planning interval in a time-resolved manner.

The microgrid may have a multiplicity of electricity consumers and electricity sources. By way of example, the microgrid could have one or more of the following nodes: photovoltaic installation; battery energy store; diesel generator; wind farm; electrical device such as machines, heaters, etc. The microgrid may in particular have a connection to a main electricity grid. The operator of the microgrid may be different from the operator of the main electricity grid. Different planning entities may be used to operate the microgrid and to operate the main electricity grid. Different operational plans may be used.

In various techniques described herein, it may be possible to perform operational planning for the microgrid based on a result of an optimization. In this case, the operational planning may provide for an exchange of power between the microgrid and the main electricity grid.

Performing the operational planning may for example comprise: transmitting and/or receiving control signals to and/or from one or more nodes of the microgrid, wherein the control signals characterize the electrical operation of the nodes. For example, a power draw and/or a power output of the various nodes could be controlled by way of the control signals.

In various examples, it would be possible for the optimization to be performed in a time-discrete manner, that is to say taking into account a number of discrete time intervals. Typical time intervals that may be taken into account in the context of the optimization may have for example a duration in the region of a few 10s of seconds to minutes.

It is possible for example for the optimization to be performed on a prospective basis for the planning interval, beginning at the current time. It would be possible in particular for the optimization to be performed on a rolling basis. This means that it is possible to use a sliding window approach in which the optimization is performed repeatedly and consecutively in a plurality of iterations, wherein the respective planning interval starts at the respective current time and is thus shifted forward in time from iteration to iteration. The planning interval may for example comprise a number of time intervals, for example 1,000 or 10,000 or more time intervals. The planning interval may typically have a length in the region of hours or days.

In some examples, a mixed-integer linear optimization (mixed-integer linear programming optimization, MILP optimization) could for example be performed. In other examples, a mixed-integer quadratic optimization, or another type of optimization, could however also be performed. By using an integer optimization, it is possible to achieve a situation whereby the optimization is able to be performed in a manner that is particularly efficient in terms of resources and fast. Binary state variables that adopt for example the value 1 or the value 0 depending on whether a particular criterion is met or not met may furthermore for example be defined.

By using a linear optimization, it is in turn possible to use an implementation of the optimization that is particularly efficient in terms of computing and less intensive in terms of resources. It may furthermore be possible to guarantee finding a global maximum or a global minimum of a target function of the optimization—taking into account one or more boundary conditions. Corresponding solution approaches for mixed-integer linear optimizations are known in principle to a person skilled in the art and may be used here. One corresponding example is described for example in: "*Optimal Operational Planning for PV-Wind-Diesel-Battery Microgrid*, G. G. Moshi, C. Bovo, and A. Berizzi, IEEE Eindhoven PowerTech, 2015".

In the various examples, a power draw between the microgrid and the main electricity grid via a corresponding connection is taken into account in connection with performing the optimization. The exchange of power may mean that electrical energy is transferred from the main electricity grid to the microgrid in one or more corresponding time intervals (power draw) and/or electric power is transferred from the microgrid to the main electricity grid in one or more further time intervals (power output). By taking an exchange of power into account, the operation of the main electricity grid and the operation of the microgrid are able to be stabilized. Consumption peaks or production peaks in the microgrid and/or in the main electricity grid are in particular able to be absorbed. As a result, incorrect functioning of individual nodes in the grids is in particular able to be avoided.

In various examples, a power draw of the microgrid from the main electricity grid in at least one HLTW of the main electricity grid is in particular taken into account. An HLTW may for example be predefined in line with an operational plan of the main electricity grid. HLTWs typically contain a particularly high power consumption of loads that are supplied by the main electricity grid. For example, the average consumed power in an HLTW may be greater by a particular factor than the average consumed power outside of HLTWs; the factor may be for example in the region of 1.2-3.0. It might be possible for example for the operator of the main electricity grid to announce one or more HLTWs at the beginning of a respective operational timeframe—for instance in each case at the beginning of a year. The one or more HLTWs may be determined for example based on historical load profiles.

In various examples, it is possible, in connection with the optimization, to take into account whether the operation of the microgrid qualifies for what is known as atypical grid usage. In order for a consumer of the main electricity grid—such as for example including the microgrid that is connected to the main electricity grid via a connection and draws power—to qualify for atypical grid usage, one or more criteria may be taken into account in connection with the power draw from the main electricity grid in the one or more HLTWs (qualification criteria).

One exemplary qualification criterion relates to the maximum power draw (peak load draw) during the HLTW in relation to the peak load draw in the entire operational timeframe but outside of the HLTWs. It may for example be sought for the ratio between the peak load draw within the HLTWs and the peak load draw outside of the HLTWs in the operational timeframe to be less than a particular predefined threshold value (relevance threshold). In this case, however, it should be understood that this criterion of the ratios of the peak load draws is merely an example. Other criteria are also conceivable in general. For example, an average power draw of the microgrid from the main electricity grid in the HLTWs in comparison with an average power draw of the microgrid from the main electricity grid outside of the HLTWs in the operational timeframe could be taken into account.

In general, it may be taken into account for the qualification of atypical grid usage that the consumer is behaving atypically since it reduces its own requirement at times at which there is typically a generally high electricity requirement. A corresponding relevance threshold may be for example in the region of 5-30%.

By taking into account atypical grid usage, it is possible for example to use the resources available in the microgrid more efficiently. Techniques that make it possible to integrate atypical grid usage into the predictive operational planning in conjunction with an optimization, for example a mixed-integer linear optimization, are described below.

Figure 1:
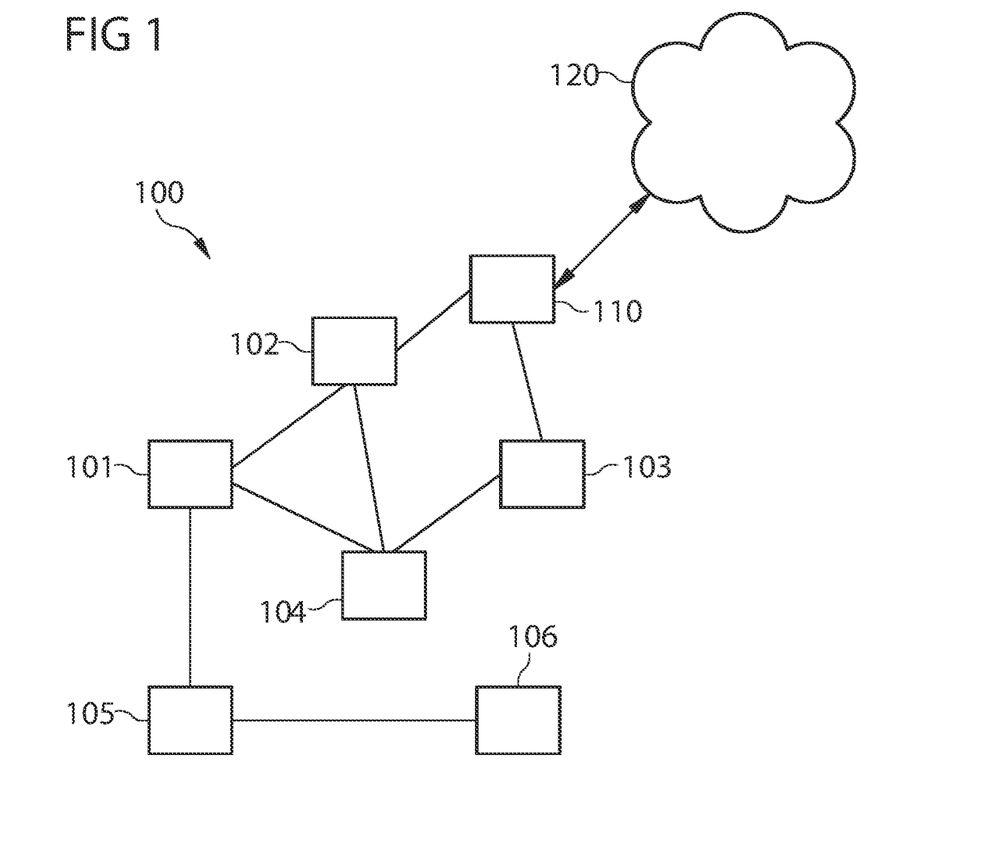
FIG. 1 schematically illustrates a microgrid having a connection to a main electricity grid according to various examples.

FIG. 1 schematically illustrates a microgrid 100 having a number of nodes 101-106. The nodes 101-106 are connected by lines, wherein the arrangement of the nodes in the microgrid 100 determines an architecture of the microgrid 100. The microgrid 100 furthermore additionally also has a further node referred to as a connection 110 that models connection of the microgrid 100 to a main electricity grid 120. An exchange of power between the microgrid 100 and the main electricity grid 120 may be implemented, that is to say an electrical energy flow may be produced, via the connection 110.

The individual operation of the various nodes 101-106 may be controlled in the context of performing operational planning of the microgrid 100. As an alternative or in addition, however, the architecture of the microgrid 100 could also be configured.

Figure 2:
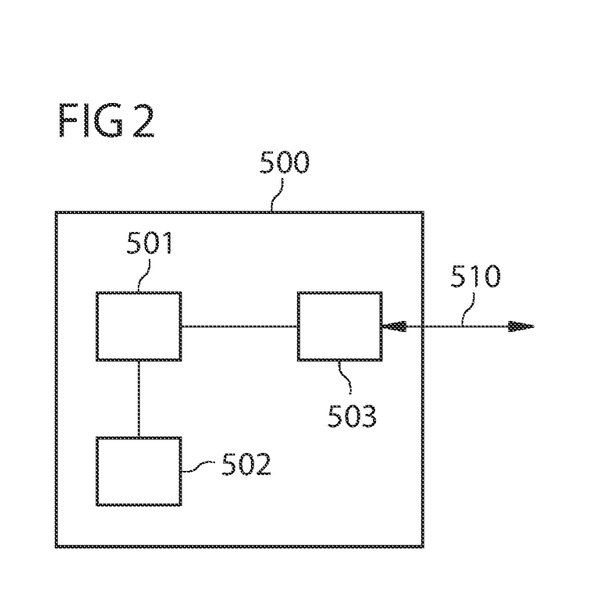
FIG. 2 schematically illustrates a device that is configured for the operational planning of the microgrid.

FIG. 2 schematically illustrates a device 500 that is able to be used to perform operational planning for the operation of a microgrid—for example of the microgrid 100 from FIG. 1. The device 500 comprises a processor 501. The processor could be implemented for example in the form of an FPGA or ASIC or microprocessor or CPU. The device 500 also comprises a memory 502, for example a non-volatile and/or a volatile memory. The memory 502 could for example be designed as a RAM memory. As an alternative or in addition, the memory 502 could be designed as a magnetic hard drive or flash memory. It may, in particular, be possible for program code to be stored in the memory 502 and to be loaded and executed by the processor 501. The processor 501 may also exchange control signals 510 with one or more of the nodes 101-106 and/or the connection 110 of the microgrid 100 via a communication interface 503. The operation of the nodes 101-106 and/or the connection 110 is thereby able to be controlled. It would also be possible for example for a flexible interconnection of the connections and lines between the various nodes 101-106 and/or the connection 110 of the microgrid 100 to be controlled via corresponding control signals 510.

When the processor 501 executes the program code loaded from the memory 502, this may have the effect that the processor 501 executes particular techniques as are described in detail below. These techniques may for example comprise: performing operational planning for a microgrid; performing an optimization, in particular an integer linear optimization, taking into account one or more boundary conditions; setting the target function and/or the one or more boundary conditions of the optimization taking into account a power draw (for example a peak load draw) of the microgrid from a main electricity grid in one or more HLTWs; etc.

Figures 3, 4:
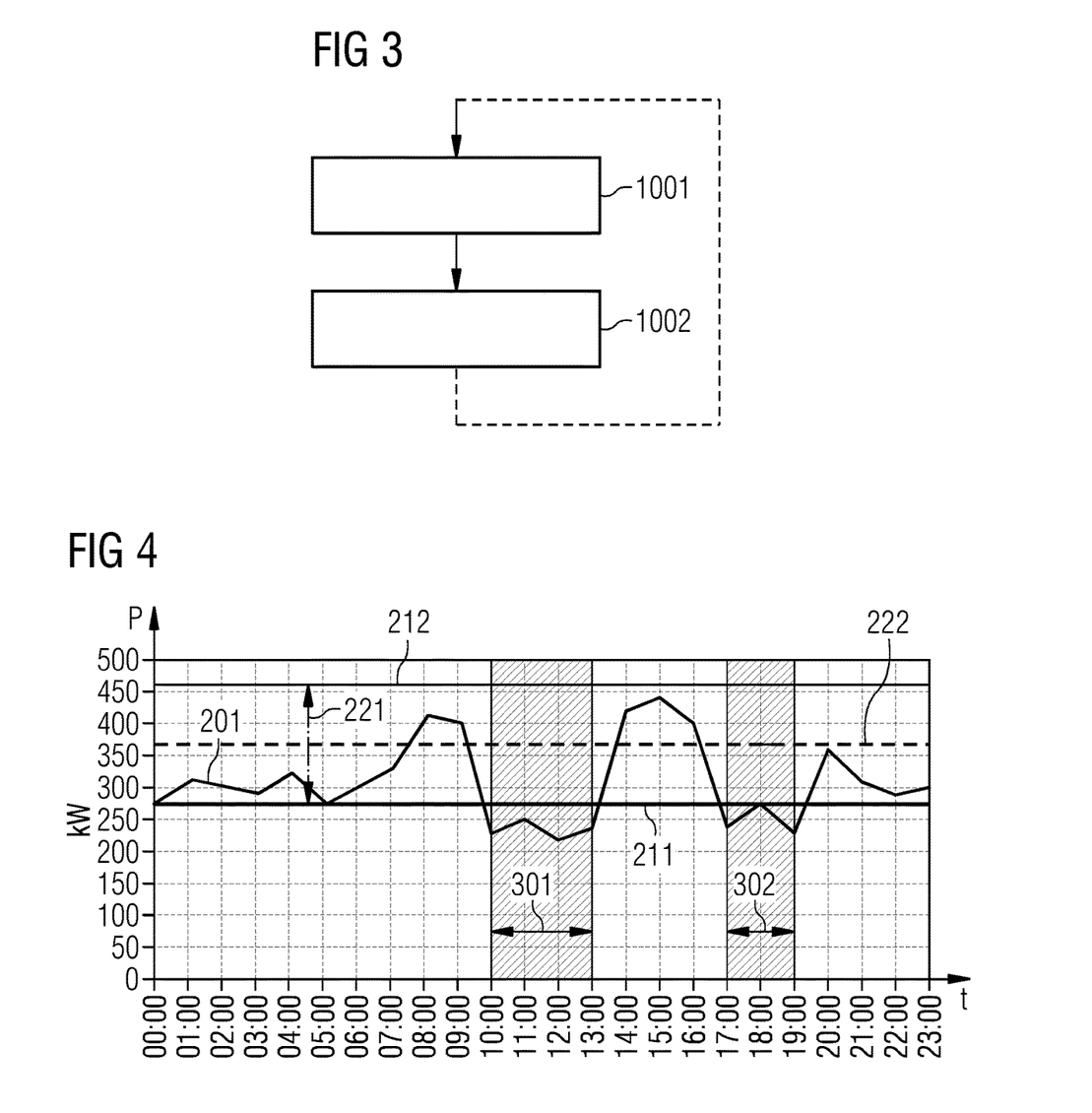
FIG. 3 is a flowchart of an exemplary method.
FIG. 4 schematically illustrates the temporal profile of a power draw of the microgrid from the main electricity grid and HLTWs according to various examples.

One possible method that may be executed by the processor 501 by loading the program code from the memory 502 is described for example in connection with the flowchart in FIG. 3.

FIG. 3 schematically illustrates a method according to various examples. FIG. 3 is a flowchart. The method in FIG. 3 could for example be executed by a device that contains a processor and a memory containing corresponding program code (cf. device 500 from FIG. 2). The method according to FIG. 3 is used for the operational planning of a microgrid, for instance of the microgrid 100 from FIG. 1.

A time-discrete optimization of a target function for a planning interval is first of all performed in block 1001. The planning interval may in particular extend into the future, starting from the current time. This means that predictive operational planning is made possible in block 1002, because particular control parameters of the various nodes of the microgrid 100 or of the microgrid 100 itself are able to be controlled on the basis of a result of the optimization from block 1001 and it is thus able to be predictively forecast how the operation of the microgrid will change over time.

The operational planning is performed in block 1002. In this case, the result of the optimization from block 1001 is taken into account. The operational planning may for example comprise determining an operational plan.

In various examples, it may be possible for the optimization and the operational planning in blocks 1001 and 1002 to be performed on a rolling basis, this being indicated by the dashed line in FIG. 3.

When performing the optimizations in block 1001, it may in particular be possible to take into account a power draw of the microgrid from the main electricity grid in at least one HLTW of the main electricity grid. It would thus be possible for example to take into account a maximum power draw of the microgrid from the main electricity grid in the at least one HLTW, that is to say the peak load draw. An average power draw could however also be taken into account, or else a value, integrated over the duration of the HLTW, for the power draw could be taken into account.

By taking into account the power draw in the at least one HLTW, it is possible to describe the positive or negative qualification for atypical grid usage. Remuneration for correspondingly supporting the operation of the main electricity grid by reducing the power draw of the microgrid from the main electricity grid in the at least one HLTW could in particular be described. Details in connection with the HLTW are illustrated in connection with FIG. 4.

FIG. 4 illustrates aspects in connection with HLTWs 301, 302. FIG. 4 in particular illustrates a power draw 201 of the microgrid 100 from the main electricity grid 120 as a function of time, here over the course of a day. The illustrated timeframe corresponds to the planning interval 602 of an optimization that is performed predictively at the time 601.

It is apparent for example from FIG. 4 that the HLTW 301 is defined during the timeframe 10:00 to 13:00; and the HLTW 302 is defined during the timeframe 17:00 to 19:00. These values are purely exemplary.

The HLTWs 301, 302 could be defined in corresponding control data that are conveyed to the device 500.

The example of FIG. 4 also illustrates the maximum power draw 212 in the entire operational timeframe—for example over the entire course of the year. This is roughly 460 kW.

FIG. 4 also illustrates the maximum power draw 211 during the HLTWs 301, 302 in the illustrated timeframe. This is about 270 kW.

FIG. 4 also illustrates a ratio 221 between the maximum power draw 211 and the maximum power draw 212. This ratio 221 meets a relevance threshold 222. This means that the operation of the microgrid in the example of FIG. 4 qualifies for atypical grid usage.

Such a possibility for atypical grid usage should be taken into account in load distribution during operation of microgrids. However, using conventional techniques for the predictive operational planning of microgrids, it is often not possible, or possible only to a limited extent, to implement the qualification for atypical grid usage. This is due to the fact that conventional techniques are often restricted to a planning interval 602 of a few hours up to a day: there are many reasons for this: a day is the typical cycle length for battery usage planning ("When do I have to charge the battery during the day and when do I use this energy again in order for example to cover load peaks?"). Forecasts about the availability of renewable energy sources and the required electricity production in the microgrid however become less reliable for longer planning intervals 602. The runtimes of the operational planning programs increase with the length of the planning interval 602. MILP-based control tools are restarted on a rolling basis and, due to the operational planning during ongoing operation, have only a limited amount of time to deliver results (real-time operation is sometimes required).

Generally speaking, the planning interval 602 of operational planning programs is thus considerably smaller than the typical operational timeframe, which is typically a year; for example, by at least a factor of 10 or more.

This accordingly gives rise to the problem of taking into account the qualification for atypical grid usage, which typically also relates to the (for example maximum) power draw from the main electricity grid in the entire current operational timeframe, in the rolling optimization with the shorter time horizon of the planning interval.

In general terms, it may thus be possible for a plurality of HLTWs to be present in the planning interval and in a historical interval that is longer than the planning interval by at least a factor of 10. It is thus in particular possible to take the historical interval into account in the operational planning. The target function may for example take into account the peak load draw of the microgrid from the main electricity grid outside of the plurality of HLTWs in the historical interval and in the planning interval.

Generally speaking, one or more characteristics of the operation of the microgrid during the historical interval may be taken into account as parameters in connection with the optimization. Since the optimization is performed at a time following the end of the historical interval, the values of these parameters are fixed at the time when the optimization is performed—it may then however take place at an update of the values of the parameters before the next iteration of the optimization is performed.

The historical interval may correspond for example to the operational timeframe over which the qualification for atypical grid usage is determined.

One exemplary implementation is discussed in detail below. In this case, a mixed-integer linear and time-discrete optimization is performed. For this purpose, the planning interval 602, [0,T] of the optimization, typically 24 hours, is divided into individual time intervals $t_n$ where $n \in \{1 \ldots N\}$, where $t_0=0$ and $t_N=T$. The following are defined:

Parameters:
$t_n$: Beginning of the time interval n
$\Delta t_n$: Length of the time interval n
$P_{Peak,His}$: Maximum power draw (peak) from the main electricity grid in the historical interval within and outside of peak-load time windows normalized to [0,1]
$\hat{P}_{Peak,His}$: Maximum power draw in HLTWs in the historical interval, normalized to [0,1]
$Id_{HD}(t_n)$: Indicator parameter that indicates whether an HLTW is active in the time interval n
$P_{ExPeak}$: Expected maximum power draw from the grid, normalized to [0,1]
$\Delta P_{Peak}$: Relevance threshold in %
$C_p$: Costs per kWp maximum power draw from the grid in €/kWp Variables:
$P(t_n)$: Power draw from the main electricity grid in the time interval n (control variable), normalized to [0,1]
$P_{Peak}$: Maximum power draw from the main electricity grid in the historical interval and planning interval, normalized to [0,1]
$\hat{P}_{Peak}$: Maximum power draw in HLTWs from the main electricity grid in the historical interval and planning interval, normalized to [0,1]
$Id_{Atyp}$: Indicator variable: Is atypical grid usage present? 1, if $\hat{P}_{Peak} \geq (1-\Delta P_{Peak}/100)*P_{Peak}$, otherwise 0
$Id_{Peak,His}$: Indicator variable: Is the maximum power draw in all of the time increments of the current planning interval less than in the historical interval?
1, if $P_{Peak,His}=\max_{k=1,\ldots,n}[P(t_k),P_{Peak,His}]$, otherwise 0
$Id_{Peak}(t_n)$: Indicator variable: Is the maximum power draw in the time interval n of the planning interval greater than in the historical interval and all of the other time intervals k?
1, if $P(t_n)=\max_{k=1,\ldots,n}[P(t_k),P_{Peak,His}]$, otherwise 0
$P_{Viol}$: $P_{Peak}-\hat{P}_{Peak}$, if $Id_{Atyp}=0$. Otherwise 0

Using these parameters and variables, a mixed-integer linear optimization program (P) is formulated in order to model the behavior of the microgrid and to minimize the costs for the power peaks of the electricity draw from the main electricity grid:

| | |
|---|---|
| (1) $\min_P c_p * (\hat{P}_{Peak} + P_{Viol})$ | (target function) |
| (2) $P_{Viol} \geq P_{Peak} - \hat{P}_{Peak} - Id_{Atyp}$ | (power exceedance) |
| (3) $Id_{Atyp} \leq 1 - (\hat{P}_{Peak} - (1 - \Delta P_{Peak}/100)*P_{Peak})$ | (qualification for atypical usage) |
| (4) $Id_{Peak,His} + \Sigma_n^N Id_{Peak}(t_n) = 1$ | (select time window P-peak) |
| (5a) $P_{Peak} \geq P(t_n)$ | (lower bound power peak) |
| (5b) $P_{Peak} \geq P_{Peak,His}$ | (lower bound power peak) |
| (5c) $P_{Peak} \leq P(t_n) + (1 - Id_{Peak}(t_n))$ | (upper bound power peak) |
| (5d) $P_{Peak} \leq P_{Peak,His} + (1 - Id_{Peak,His})$ | (upper bound power peak) |
| (6a) $\hat{P}_{Peak} \geq (t_n)$, if $Id_{HD}(t_n) = 1$ | (lower bound power peak HLTW) |
| (6b) $\hat{P}_{Peak} \geq \hat{P}_{Peak,His}$ | (lower bound power peak HLTW) |

Using equation (3), it is thus able to be established whether atypical grid usage is present. A case differentiation is then made using the indicator variables $Id_{Atyp}$ in the target function using equation (1).

This optimization program is controlled via the power points P(t) of the connection to the main electricity grid. The target function (1) is the sum of the costs arising for the maximum power draw from the main electricity grid, and should be minimized.

The boundary condition (2) describes the difference between the maximum power draw from the main electricity grid and the maximum power draw from the main electricity grid in the HLTWs in the event that there is no qualification for atypical grid usage. This is achieved by subtracting the indicator variable $Id_{Atyp}$: If $Id_{Atyp}=1$, that is to say the microgrid qualifies for atypical grid usage, then $P_{Viol}=0$ may be set and the target function is calculated only on the basis of the power peak in the HLTW $\hat{P}_{Peak}$. If $Id_{Atyp}=0$, that is to say the microgrid does not qualify for atypical grid usage, then it must be the case that $P_{Viol}=P_{Peak}-\hat{P}_{Peak}$ and the target function is calculated on the basis of the power peak $P_{Peak}$. Other formulations for the target function are however also possible.

The qualification for atypical grid usage is described by way of inequality (3). If the difference between $P_{Peak}$ and $\hat{P}_{Peak}$ is greater than or equal to the relevance threshold $\Delta P_{Peak}$, then $Id_{Atyp}=1$, otherwise $Id_{Atyp}=0$.

Equation (4) ensures selection of the time increment in which the maximum power draw occurs. This is achieved by way of an SOS-1 boundary condition on indicator variables.

The boundary conditions (5a)-(5d) ensure that the maximum power draw $P_{Peak}$ corresponding to the power draws $P(t_n)$ is calculated in the current future horizon or planning interval and in the historical interval. Inequalities (6a) and (6b) deliver lower bounds for the maximum power draw $\hat{P}_{Peak}$ in HLTWs of the current future horizon and of the historical interval.

Following each invocation of the optimization, the maximum power draw from the grid in the historical interval $P_{Peak,His}$, and in the HLTWs $\hat{P}_{Peak,His}$ is updated in the ongoing future horizon according to the actual power draws. This means that the corresponding values are updated depending on the corresponding operational planning.

It may be the case that there is still no information available about the historical interval. This may be the case for example when the historical interval is initialized. This may be the case when the operational timeframe begins (for example at the beginning of a year).

At the beginning of the historical interval, the maximum power draw may thus be initialized with the expected/assumed maximum power draw:

$$P_{Peak,His}=P_{ExPeak} \text{ and } \hat{P}_{Peak,His}=P_{ExPeak}*(1-\Delta P_{Peak}/100).$$

Specifically, in this situation, no information is available about the historical interval. A plausible assumption for the marginal power draw in the peak-load time windows—and optionally also outside of the peak-load time windows—is therefore used in order to avoid an erratic result of the optimization.

In some applications, instead of one-off daily planning, rolling operational planning with regular re-optimization is performed. This is supported by the techniques described above (sliding the planning interval and conveying the current system state, for example the previous power peaks within and outside of the HLTWs in the historical interval). In other words, this means that it is possible, for each iteration with performance of the optimization, to form a value for the further maximum power draw (outside of the HLTWs in the historical interval) from a correspondingly retained variable and then to update this value depending on the operational planning, that is to say after defining the maximum power draw including in the respective planning interval. If for example a higher further maximum power draw is implemented outside of the HLTWs in the current planning interval (in comparison with the previous maximum power draw in the historical interval), then the value of the corresponding variables may be adjusted.

The following is also noted in connection with equations (1)-(4): The indicator variable $Id_{Atyp}$, describes whether or not a qualification for atypical grid usage is present. In the context of the optimization, the maximum power draw within the HLTWs and/or the maximum power draw outside of the HLTWs may be adjusted in order to change the value for this indicator variable—or the qualification for atypical grid usage. If for example a comparatively large maximum power draw above the relevance threshold was implemented in one or more HLTWs in the historical interval, then this may mean that even a particularly low maximum power draw in one or more HLTWs in the planning interval may not allow renewed qualification for atypical grid usage. There may then not be any particular incentive to limit the power draw in the HLTWs. On the other hand, it could be the case that renewed requalification for atypical grid usage may be achieved through a short-term increase in the maximum power draw outside of the HLTWs in the planning interval. This and further behavior may be described by taking into account the case differentiation in the target function between qualification for atypical grid operation and lack of qualification for atypical operation—modeled by the indicator variable.

It is apparent from equation (1) that the target function, in the case of qualification for atypical grid operation, may have a predefined bonus, specifically for example calculation in connection only with the power peak in the one or more HLTWs in the historical interval and in the planning interval (typically a comparatively low value): whereas, in the case of lack of qualification for atypical grid operation, the target function is determined on the basis of the power peak in the entire historical interval and in the planning interval outside of the HLTWs (typically a comparatively large value).

It should in principle be understood here that the target function also formulated in equation (I) may be only part of a target function to be taken into account as a whole. Many other target specifications may typically also be taken into account in connection with the target function, for example wear, switched-on/switched-off positions, etc. The target function or the parameters and variables outlined above may however simply be integrated into existing optimization or operational planning approaches, as described for example in "*Optimal Operational Planning for PV-Wind-Diesel-Battery Microgrid*", G. G. Moshi, C. Bovo, and A. Berizxi, IEEE Eindhoven PowerTech, 2015.

Figure 5:
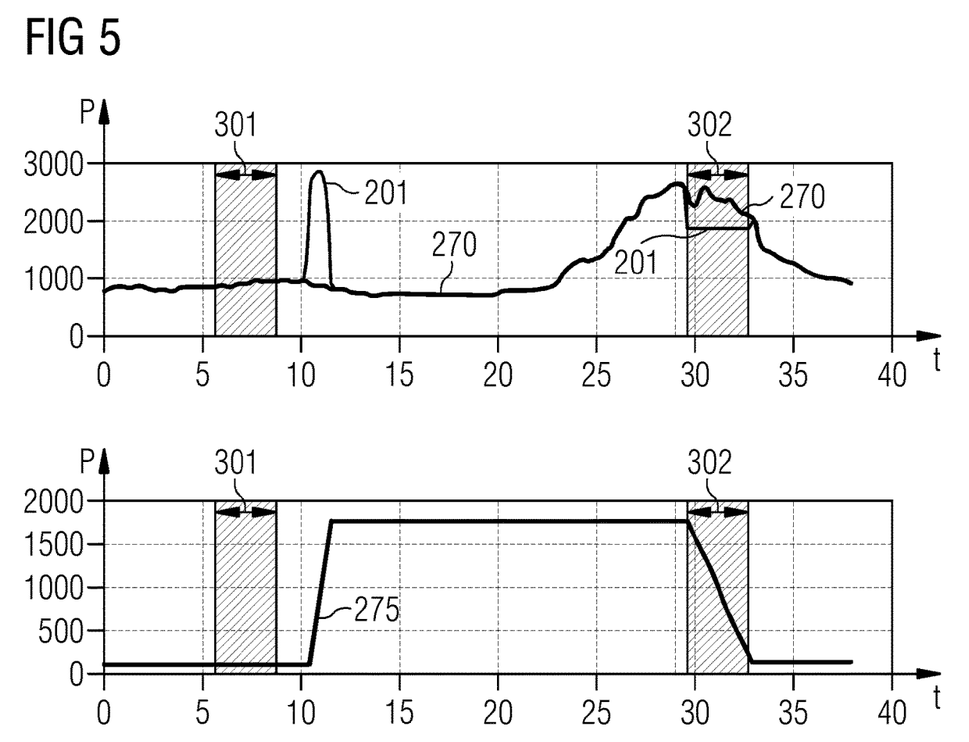
FIG. 5 schematically illustrates a power draw of the microgrid from the main electricity grid in line with operational planning based on an optimization taking into account HLTWs according to various examples.

FIG. 5 illustrates aspects in connection with the predictive operational planning of microgrids taking into account HLTWs of a main electricity grid. FIG. 5 in particular illustrates the power draw 201 of the microgrid from the main electricity grid 120 via the connection 110 as a function of time. In the example of FIG. 5, the operational planning determining the power draw 201 has been performed using techniques as have been described above. In this case, in the example of FIG. 5, consideration is given to a simplified microgrid 100 that comprises a connection to a main electricity grid 120, a load and a battery. Two HLTWs 301, 302 are defined in connection with the main electricity grid 120. The planning interval 602 has a length of 24 hours. For this reason, in connection with the optimization, the HLTW 302 from roughly 10:00 is taken into account: the HLTW 302 extends over the timeframe from 30 hours to 33 hours.

It is apparent from FIG. 5 that optimizing operational planning has the effect that the power draw 201 from the main electricity grid 120 is reduced during the HLTW 302: the power consumption 270 of the load is also supplied in part by drawing the corresponding power from the battery. The power consumption 270 of the load is in particular greater in the HLTW 302 than the power draw 201 from the main electricity grid 120. The battery is accordingly charged in advance (in the timeframe from around 10:00 to around 11:00, see FIG. 5 below, where the state of charge 275 is illustrated) in order to minimize the peak of the power draw 201 from the main electricity grid 120 in the HLTW 302. Qualification for atypical grid usage is thereby able to be achieved.

In summary, the above techniques have been disclosed for taking into account atypical grid usage in connection with HLTWs in programs for performing an integer linear optimization in connection with the predictive, rolling control of microgrids. A flexible approach makes it possible to configure the atypical grid usage in various microgrids of different operators with a uniform set of parameters. Techniques that are easily able to be integrated into mixed-integer linear optimizations in line with a reference implementation have in particular been described.

The techniques described herein have the following advantages:

Simplicity: Taking into account atypical grid usage is easily able to be integrated into conventional programs with predictive integer linear optimization. Predictive, rolling control of microgrids is thereby made possible.

Increase in efficiency: Taking into account atypical grid usage makes it possible to minimize operating costs of microgrids.

Flexibility: Using the outlined approach, atypical grid usage in various microgrids of different operators is able to be configured and used with a uniform set of parameters.

The features of the above-described embodiments and aspects of the invention may of course be combined with one another. The features may in particular be used not only in the described combinations but also in other combinations or on their own without departing from the field of embodiments of the invention.

By way of example, techniques in which qualification for atypical grid usage depends on a ratio between a maximum power draw in one or more HLTWs to a maximum power draw outside of the one or more HLTWs in a historical interval and in a planning interval have been described above. Corresponding parameter values for the historical interval may be updated continuously. In other examples, qualification for atypical grid usage could depend on other or further criteria. By way of example, instead of a maximum power draw within the HLTWs and/or outside of the HLTWs, an average power draw within the HLTWs and/or outside of the HLTWs or an integrated power draw could also be taken into account.

Techniques in which remuneration in the event of qualifying for atypical grid operation depends on the maximum power draw within an HLTW have furthermore been described above. In other examples, remuneration for qualifying for atypical grid operation could also be designed in another way. By way of example, the average electricity consumption within the HLTWs could be decisive for remuneration in connection with qualifying for atypical grid usage.

Techniques in which qualification for atypical grid usage has been taken into account in connection with a mixed-integer linear optimization have furthermore been described above. In other examples, other optimization techniques could also be taken into account, for example mixed-integer quadratic optimizations or else non-integer optimizations.

Various examples have furthermore been described in which an average or maximum power draw from the main electricity grid during HLTWs is taken into account in the context of the optimization. In some examples, a power output from the microgrid to the main electricity grid could also be taken into account.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for predictive operational planning in a microgrid having a plurality of nodes and a connection to a main electricity grid, wherein the method comprises:
optimizing a target function for a planning interval of the microgrid, wherein the target function takes into account a power draw of the microgrid from the main electricity grid in at least one high-load time window of the main electricity grid, wherein the at least one high-load time window comprises a plurality of high-load time windows, wherein the plurality of high-load time windows are arranged in the planning interval and in a historical interval that is longer than the planning interval by at least a factor of 10, wherein the target function takes into account a further power draw of the microgrid from the main electricity grid outside of the plurality of high-load time windows in the historical interval and in the planning interval,
performing the predictive operational planning based on a result of the optimization; and
controlling at least one node of the plurality of nodes according to the predictive operational planning, wherein controlling the at least one node includes exchanging power between the microgrid and the main electricity grid.

2. The method as claimed in claim 1, further comprising:
loading at least one value for the power draw and/or the further power draw from a variable in connection with performing the optimization, and
updating the at least one value depending on the operational planning.

3. The method as claimed in claim 1,
wherein the target function takes into account a case differentiation between (i) qualifying for atypical grid operation and (ii) not qualifying for atypical grid operation,
wherein the case differentiation is made depending on a ratio of the power draw and the further power draw.

4. The method as claimed in claim 3,
wherein the target function has a predefined bonus in the case (i) of qualifying for atypical grid operation,
wherein the target function does not have the predefined bonus in the case (ii) of not qualifying for atypical grid operation.

5. The method as claimed in claim 1, further comprising:
if no information is available about the historical interval:
  using an assumption for the maximum power draw of the microgrid from the main electricity grid in the plurality of high-load time windows.

6. The method as claimed in claim 1,
wherein the optimization is performed as a mixed-integer linear optimization.

7. A device having a processor that is configured to:
optimize a target function for a planning interval of a microgrid having a plurality of nodes, wherein the target function takes into account a power draw of the microgrid from a main electricity grid in at least one high-load time window of the main electricity grid, wherein the at least one high-load time window comprises a plurality of high-load time windows, wherein the plurality of high-load time windows are arranged in the planning interval and in a historical interval that is longer than the planning interval by at least a factor of 10, wherein the target function takes into account a further power draw of the microgrid from the main electricity grid outside of the plurality of high-load time windows in the historical interval and in the planning interval;
perform operational planning of the microgrid based on a result of the optimization; and
control at least one node of the plurality of nodes according to the operational planning, wherein controlling the at least one node includes exchanging power between the microgrid and the main electricity grid.

8. The device as claimed in claim 7, wherein the processor is further configured to execute a method for predictive operational planning in the microgrid.

* * * * *